Patented Sept. 13, 1949

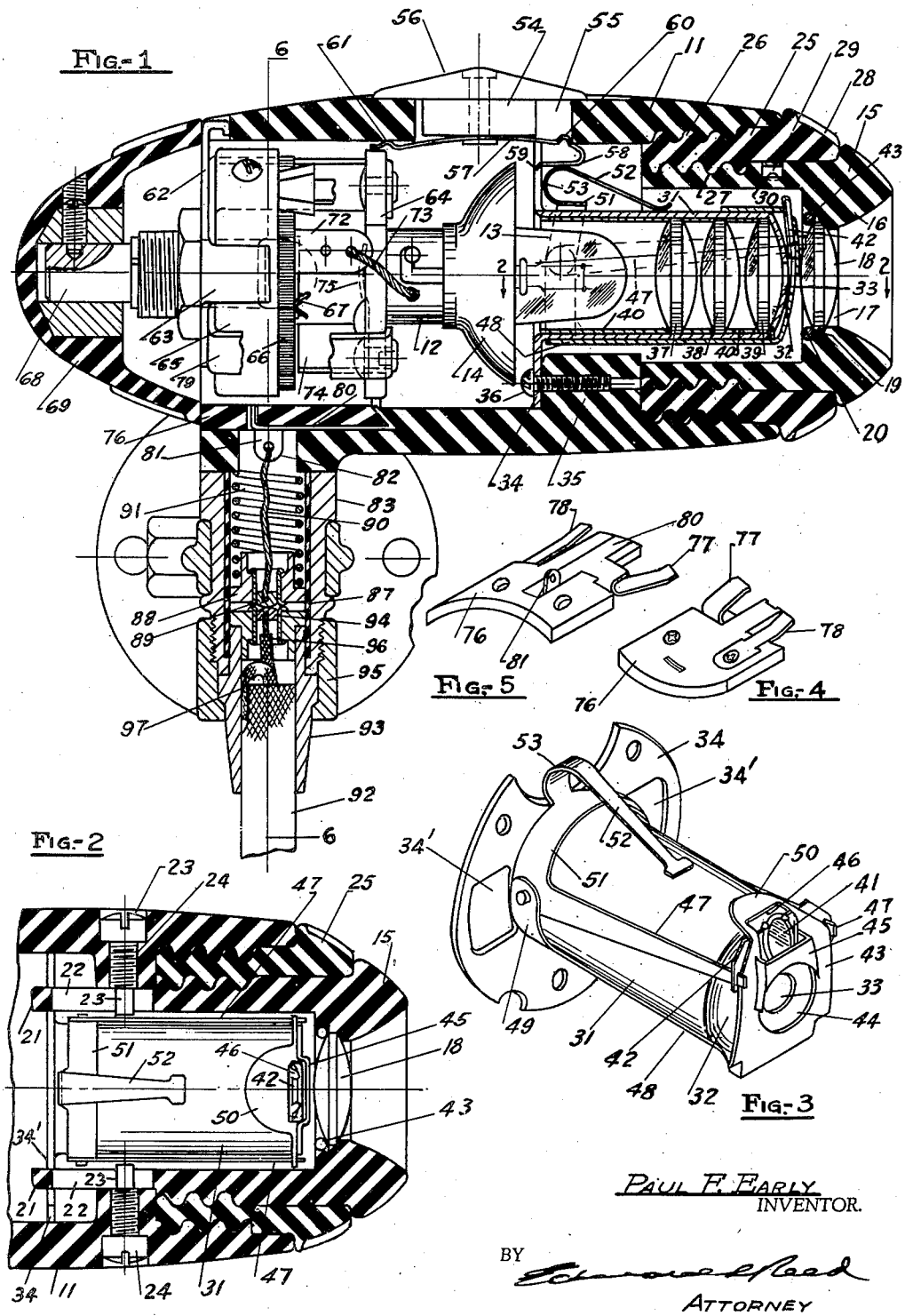

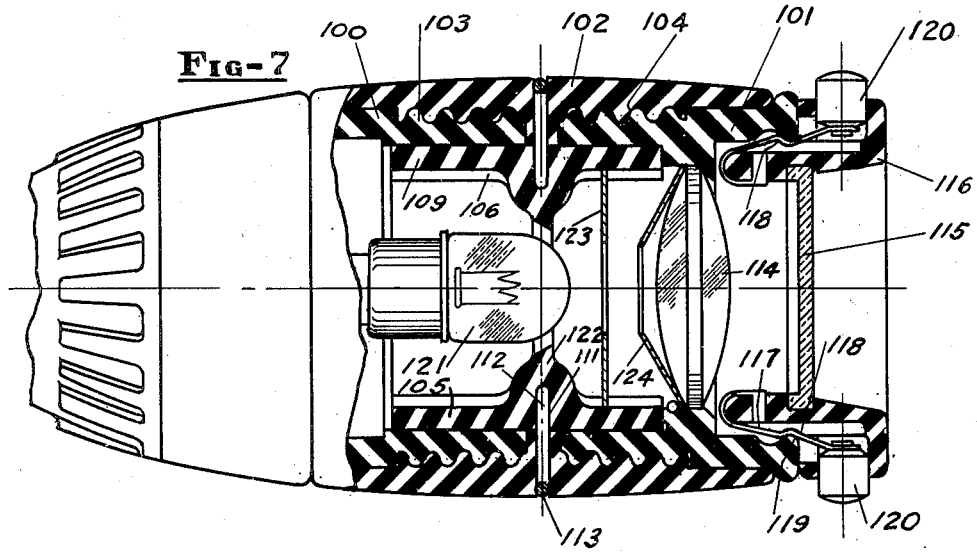
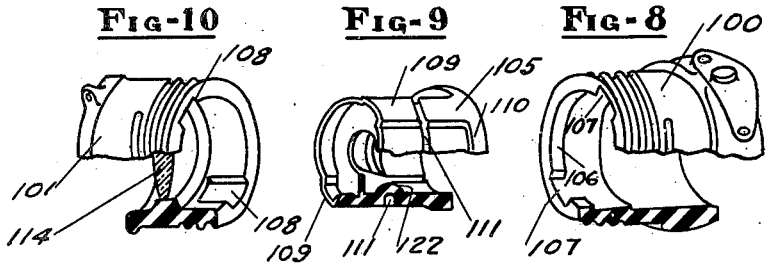
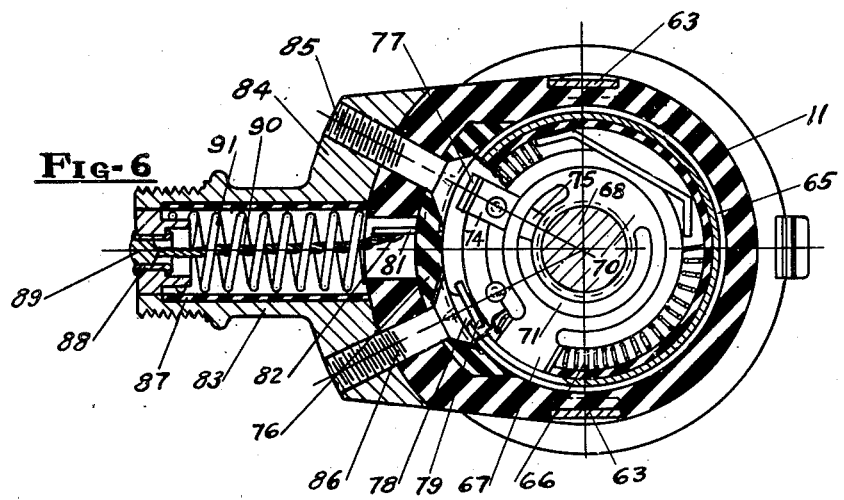

2,481,988

UNITED STATES PATENT OFFICE 2,481,988

LIGHT PROJECTING DEVICE

Paul F. Early, Dayton, Ohio, assignor to Standard-Thomson Corporation, a corporation of Delaware Application November 4, 1944, Serial No. 561,855

3 Claims. (Cl. 240—41)

This invention relates to a light projecting device and more particularly to a device of the type known as a cockpit lamp, which is designed more particularly for use on military aircraft but is not limited to such use. The present application is a continuation in part of my pending application filed October 16, 1943, Serial No. 506,482, now Patent No. 2,404,476, dated July 23, 1946.

In the operation of aircraft at night it is important that there should be at least sufficient illumination within the same to render the instrument panel visible and to enable other instrumentalities to be observed and operated, and in the operation of military aircraft it is equally important that there should be no light in or on the same which would be visible to enemy aircraft or from the ground when operating over enemy territory. It has been proposed heretofore to equip military aircraft with a lamp or lamps which can be adjusted to provide a diffused or floodlight illumination when such illumination is not objectionable and, when concealment is necessary, to provide a concentrated beam, or spotlight, which can be confined to a particular instrument or other restricted area which is to be illuminated.

It is one object of the invention to provide such a light projecting device of improved construction and operation.

A further object of the invention is to provide such a device which can be quickly and easily adjusted to provide the desired illumination and which will be automatically retained in its adjusted position.

A further object of the invention is to provide such a device in which maximum adjustment may be effected by a relatively small movement of the adjusting element.

A further object of the invention is to provide such a device in which the projected beam is sharply defined and free from stray rays of light.

A further object of the invention is to provide such a device in which the light within the defined pattern is of uniform intensity and free from dark sections, such as the image of the lamp filament.

A further object of the invention is to provide such a device with operable means for reducing the brilliancy of the projected light which can be mounted within the device and can be actuated from the exterior thereof without interfering with the illumination adjusting means.

Other objects of the invention may appear as the device is described in detail.

In the accompanying drawings Fig. 1 is a longitudinal section taken lengthwise of a device embodying the invention and partly broken away; Fig. 2 is a longitudinal sectional view taken through the forward end of the device on the line 2—2 on Fig. 1 and partly in top plan; Fig. 3 is a detail view of the filter and its operating mechanism; Fig. 4 is a perspective view of the contact unit forming part of the means for connecting the lamp with an exterior source of electric current; Fig. 5 is an inverted view of the unit of Fig. 4; Fig. 6 is a transverse section taken on the line 6—6 of Fig. 1 omitting the cable connection; Fig. 7 is a longitudinal section taken through another embodiment of the invention; Fig. 8 is a perspective view, partly broken away, of the body member of the device of Fig. 7; Fig. 9 is a perspective view, partly broken away, of the key element of Fig. 7; and Fig. 10 is a perspective view, partly broken away, of the lens supporting member of Fig. 7.

In these drawings I have illustrated two embodiments of the invention, each of which comprises a tubular structure in or on which are supported the lamp, the controlling means for the lamp, the focusing lens and their associated parts. This structure includes a tubular body member, which is normally stationary and by which the movable elements are supported, a supporting member for the focusing lens which is axially adjustable with relation to the stationary member, and an adjusting device which is preferably rotatable about the longitudinal axis of the stationary member and is so connected with the stationary member and the lens supporting member, by screw threads or otherwise, that the rotation of the adjusting device will impart axial movement to that device with relation to the stationary member and will cause the lens supporting member to move axially with the adjusting device and with relation thereto. Thus the lens supporting member moves a greater distance than the adjusting device moves, thereby enabling the relatively large axial movement to be imparted to the lens supporting member by a small rotary movement of the adjusting device. It is to be understood, however, that these embodiments have been chosen for the purpose of illustration only and the light projecting device as a whole, as well as the several parts thereof, may take various forms and may be operated in various ways without departing from the spirit of the invention.

In that embodiment of the invention shown in Figs. 1 to 6 the tubular body member 11 extends for the major portion of the length of the projecting device as a whole and is substantially cylindrical in form. Mounted in the body member is means, such as a lamp socket 12, for supporting the lamp 13, the lamp socket being in the present instance provided with a reflector 14. The lens supporting member 15 is tubular in form and has a substantially cylindrical portion adapted to extend into the forward end of the body member 11 and of an external diameter substantially less than the internal diameter of the adjacent portion of the body member 11. At its forward end the lens supporting member has an inwardly extending annular part 16 providing an opening 17 of relatively small diameter to receive a focussing lens 18. The lens is mounted on a seat 19 in the part 16 and is retained on said seat by a snap ring 20. The cylindrical part of the lens supporting member which extends to the rear of the lens has an internal diameter substantially larger than the diameter of the opening 17 and is provided with rearwardly extending projections or arms 21 having longitudinal slots 22 into which extend pins 23 carried by screws 24 mounted in the respective sides of the body member 11, so that the lens supporting member is held against rotation with relation to the body member but is free to move axially with relation thereto. Arranged between the forward portion of the body member and the lens supporting member is an adjusting device 25 which is tubular in form and which has screw threaded connection with the body member, as shown at 26, and with the lens supporting member, as shown at 27, whereby the rotation of the adjusting member will cause the same to move axially with relation to the body member and will cause the lens supporting member to move axially with the adjusting member and with relation thereto so that the lens supporting member will move a distance substantially greater than the distance the adjusting device moves. The adjusting device has a part arranged exteriorly of the body member by means of which it may be rotated and, as here shown, this part comprises a thickened portion 28 at the forward end of the adjusting device which is provided with a knurled or ribbed outer surface. A leaf spring 29 seated in a groove 30 in the lens supporting member bears against the unthreaded portion of the inner surface of the adjusting device and frictionally holds the latter against rotation until positive force is applied thereto. It will be apparent therefore that the focussing lens can be moved from one limit to the other limit of its movement with relation to the lamp 13 by relatively small rotary movement of the adjusting device and that the lens and its supporting member are automatically retained in the positions to which they have been moved. It will be noted that the threaded connection 27 between the lens supporting member 15 and the adjusting member 25 terminates a substantial distance from the outer ends of those members so as to provide the two members with smooth cylindrical bearing surfaces, and that the adjusting member and the body member 11 are also provided with cylindrical bearing surfaces between the threaded connection 26 and the enlarged head 28 of the adjusting member. The lengths of these bearing surfaces are such that the lens supporting member can be moved to the outer limit of its adjustment without exposing the threads on any of said members. This is important when precision adjustment is required, because the accumulation of dust or other foreign matter on exposed threads would result in excessive wear on the threads during subsequent adjustments.

When the light is transmitted directly from the lamp to the focussing lens the image of the lamp filament will appear upon the pattern defined by the projected light and this is often highly objectionable, particularly when the light rays have been concentrated to form a light pattern, or spotlight, of a relatively small diameter. To eliminate this image from the projected light pattern I utilize collecting lenses to concentrate the rays of light from the lamp into a compact form or beam in advance of the focussing lens and then slightly diffuse the concentrated rays before they enter the focussing lens. The means for accomplishing this result may take various forms but in order to adapt the same for use in a light projecting device of the type here shown I have mounted within the tubular structure a cylindrical shell 31 which, in the present instance, has an open rear end into which the lamp 13 extends and a front end wall 32 having a small diameter light opening 33 in axial alinement with the focussing lens 18. This shell may be mounted in the tubular structure in any suitable manner but preferably it is provided at its rear end with a radial flange 34 which is secured to inwardly extending projections or blocks secured to and preferably formed integral with the body member 11, one of the blocks being shown at 35 to which the flange is attached by a screw 36. The flange is provided with openings 34' through which the projections 21 on the lens supporting member may pass. Mounted within this shell are three lenses 37, 38 and 39. The lenses may be mounted within the shell and secured in proper relative positions therein in any suitable manner. In the present instance, the front surface of the lens 39 fits snugly against the end wall 32 of the shell, which is shaped to conform to the front surface of the lens. The lenses are retained in proper spaced relation one to the other by spacing sleeves 40. The first collecting lens 37 partially condenses the rays of light from the lamp and transmits the same to an intermediate portion of the second collecting lens 38 which further condenses the rays and transmits the same to the central portion of the third lens 39 from which they are transmitted through the light opening 33 to the focussing lens 18. The desired diffusion of the concentrated rays of light is preferably effected by leaving one of the adjacent surfaces of the lenses 38 and 39, preferably the forward surface of the lens 38, in an unpolished or partially polished condition. This provides sufficient diffusion of the concentrated rays to effect the elimination of the filament image without appreciably modifying the character of the projected light.

In many installations it is desirable that means be provided for materially subduing the brilliancy of the projected light, this being best accomplished by means of a light filter interposed in the path of the projected light. In this form of the device I have shown means for movably supporting the light filter within the tubular structure itself adjacent to the focussing lens and for moving the same into and out of the path of the light from the collecting lenses. The filter itself preferably comprises a disk of translucent material, such as red glass or plastic, as shown at 41. In the particular arrangement here shown, the filter disk is carried by a holder 42 in the nature of a small plate having an opening therethrough and means for supporting the disk in line with that opening. The disk and its filter are supported for movement between the end wall 32 of the shell 31 and a transverse plate or guard 43 which is supported in fixed spaced relation to the end wall 32 and has an opening 44 in line with and preferably somewhat larger than the light opening 33 of the shell. The opening 44 is extended upwardly and the plate 43 also has a forwardly extending part 45 forming a channel through which the filter disk may move into and out of alinement with the light opening 33, the lower edge of this part 45 being concentric with the light opening 33 and cooperating with the lower portion of the opening 44 to form a circular opening. The opening 44 is extended upwardly above the part 45, as shown at 46, to permit the disk to extend through the same and into the channel formed by the part 45.

The disk holder 42 is preferably pivotally supported and, as here shown, is provided with openings through which extend the forward ends of levers 47 which are pivotally supported adjacent their rear ends on the shell. In the present instance, a strip of metal 48 extends rearwardly from the lower edge of the plate 43 and is provided at its rear end with curved arms 49 which extend upwardly on opposite sides of the shell and which are rigidly connected with the shell, as by soldering the same to the shell or to the flange 34. The strip 48 supports the plate 43 and the upper end of that plate is of reduced width and is bent rearwardly above the shell, as shown at 50, so as to carry the upper end of the opening 44 rearwardly and permit the disk to project through the same when the latter is in its elevated or inoperative position. The levers 47 are connected one with the other for movement in unison about a common axis and, as here shown, they are pivotally mounted on the upper ends of the arms 49 and are connected one to the other by a yoke 51 which extends about the upper portion of the shell. The levers are preferably yieldably supported in their uppermost positions to retain the filter disk in its inoperative position and a suitable actuating device is provided for moving the levers and therefore the filter from one position to another and for retaining the same in the positions to which they have been moved. As here shown, a flat spring 52 is secured to, and preferably formed integral with, the yoke 51 and extends a short distance to the rear thereof, then curves upwardly and forwardly at 53, then slopes downwardly into contact with the top of the shell 31, the arrangement being such that the spring will be placed under tension when the yoke is moved forwardly about the pivotal axis of the lever. The actuating means for moving the filter supporting device against the action of the spring may take various forms. In the preferred construction it comprises a block 54 slidably mounted in a longitudinal slot 55 in the upper part of the body member and having an external part or finger piece 56 slidably supported on the body member by which it may be moved. Secured to the inner side of the slide block 54 is a strip of resilient metal 57 having its forward end bent downwardly and rearwardly above and preferably in contact with the curved rear portion of the spring 52, as shown at 58. The rear end of this lower portion 59 is turned downwardly so as to engage the curved rear end of the spring when the slide block 54 is moved forwardly and to thus rock the yoke 51 about its axis against the action of the spring 52 and move the filter disk into line with the light opening 33. The resilient strip 57 is provided with an outwardly extending projection 60 so arranged that when the slide block is in its rearmost position the projection 60 will extend into the slot 55 and engage the front wall thereof to yieldably resist the forward movement of the slide block. The rear portion of the resilient strip is likewise provided with a projection 61 arranged to extend into the slot when the slide block has been moved to its foremost position and thus yieldably retain the filter in its operative position.

The lamp 13 may be connected with an exterior source of current and the flow of the current to the lamp controlled in any suitable manner. In the present instance, a frame 62 is removably mounted in the rear portion of the body member and is retained therein by clips 63. The lamp socket 12 is mounted in and insulated from the front member 64 of this frame. Mounted in the rear portion of the frame and rigidly secured thereto is a rheostat which comprises a cup-shaped element 65 carried by the frame and a rheostat winding 66 mounted in and projecting beyond the front edge of the cup-shaped element. The movable member 67 of the rheostat is in the form of a yieldable finger which is carried by and electrically connected with a shaft 68 which is rotatably mounted in the frame 62 and projects rearwardly beyond the same where it is connected with a rotatable knob 69. As shown in Fig. 6 the contact finger 67 projects from a substantially circular plate 70 which is mounted on the shaft and which is provided with an arcuate slot 71 to provide the desired yieldability in the finger. One end of the rheostat winding 66 is connected by a conductor bar 72 and a short flexible conductor or jumper 73 with the cylindrical casing of the lamp socket. Mounted on and extending rearwardly from the front member 64 of the frame is a contact member 74 and a spring 75 is connected with the contact member and extends across the rear end of the lamp socket for yieldable engagement with the central contact of the lamp base. Both the contact member 64 and the spring 75 are insulated from the frame. Mounted in the body member near the rear end thereof is an arcuate insulating block 76 which carries two contact members 77 and 78 which project into the body member and are so arranged that when the removable frame 62 is inserted in the body member the contact 77 will engage the contact member 74 and the contact member 78 will engage a part of the frame, in the present instance the bar 79, which is electrically connected with the shaft which carries the movable contact finger 67. The contact member 77 is carried by and forms a part of a conductor bar 80 mounted in the lower portion of the block 76 and having a lug 81 which extends into an opening 82 in the lower wall of the body member. A tubular element or connector 83 is arranged beneath the opening 82 and is provided with an arcuate member or shoe 84 which extends about the lower portion of the body member and is rigidly secured thereto by screws 85 and 86, which also extend through insulating block 76 and secure the latter to the body member. The interior of the tubular element 83 is lined with insulating material 87 and slidably mounted therein is a block 88 provided with a central contact member 89 which is connected by a flexible conductor 90 with the lug 81 of the conductor bar 80. A spring 91 urges the slide block 88 toward the outer end of the tubular element. The conductor cable 92 has secured to the end thereof a tubular element 93 adapted to project into the lower portion of the tubular element 83 and having mounted therein a central contact member 94. A collar or coupling member 95 is screw threaded onto the lower end of the tubular element 83 to connect the cable therewith and moves the contact member 94 into engagement with the contact member 89 and presses the same inwardly against the action of the spring 91 so as to provide firm engagement between the two contacts. The contact member 94 is connected with one conductor, 96, of the cable and the other conductor, 97, of the cable is turned over against the wall of the tubular element 93 and secured in electrical contact therewith. The metallic tubular elements, nut and screw 86 electrically connect the conductor 97 with the contact member 78 which is held in place by and is in electrical contact with the screw 86. Thus the conductors of the cable 92 are electrically connected respectively with the cylindrical wall of the lamp socket 12 and with the contact in the base of the lamp and the flow of the current is controlled by the rotation of the knob 69.

In Figs. 7 to 10 there is shown another embodiment of the invention in which the tubular structure comprises a relatively short tubular body member 100 and a non-rotatable tubular lens supporting element 101, of substantially the same diameter as the body member and arranged in axial alinement therewith. A tubular adjusting device 102 is rotatably supported on the body member and lens supporting member and is connected with those members by screw threads 103 and 104. One of said connections comprises a right hand thread and the other a left hand thread so that the rotation of the adjusting device on the body member and the lens supporting member will cause the adjusting device to move axially with relation to the body member and will cause the lens adjusting member to move with the adjusting device and also to move axially with relation thereto in the same direction as the adjusting device moves. The lens supporting member may be held against rotation in any suitable manner and, as here shown, a substantially cylindrical key element 105 is mounted in the tubular structure and extends into both the body member and the lens supporting member. The body member is provided at its forward end with an inwardly extending circumferential rib or flange 106 having notches 107 forming keyways, and the lens supporting member is provided with longitudinal grooves 108 which also form keyways. The key member 105 is provided with exterior longitudinal ribs 109 and is also provided at its rear end with a circumferential external rib or flange 110. The ribs 109 are slidably mounted in the keyways 107 and 108 so that the key element is held against rotation and in turn holds the lens supporting member against rotation. The key element is connected with the adjusting device 102 for axial movement therewith and, in the present instance, it is provided with a circumferential groove 111 into which extend a plurality of pins 112 mounted in openings in the adjusting device and retained therein by a snap ring 113. The ribs 106 and 110 limit the forward movement of the key element with relation to the body member thus positively interrupting the rotation of the adjusting device and preventing further movement of the lens adjusting device. Means are provided for supporting a light filter in front of the lens 114 which is carried by the lens supporting member. The filter preferably comprises a disk 115 of translucent material, such as glass or suitable plastic material. This disk is mounted in an annular holder 116 having a portion of reduced diameter adapted to extend into the tubular lens supporting element in front of the lens. Springs 117 connected with the inner edge portion of the holder extend outwardly between the small diameter portion of the holder and the lens supporting member and are provided with recessed portions 118 to engage projections 119 on the lens supporting member. Push buttons 120 are slidably mounted in the forward portion of the holder 116 and are connected with the springs 118 to depress the same and release the filter holder for removal.

A lamp 121 is supported by the body portion and extends into the tubular key element. The means for connecting the lamp with a source of current and for controlling the flow of current to the lamp may be similar to those above described or of any suitable character and are not here shown. To eliminate stray rays of light from the lens 114 and the projected beam the key element is provided with an inwardly extending flange 122 surrounding the lamp which serves to prevent the light being reflected onto the lens from the inner surfaces of the parts in the rear of the flange. An annular shield 123 carried by the forward portion of the key element has a central opening approximating the diameter of the lamp and prevents the forward reflection of light from the adjacent surfaces of the key member and its flange. A conical shield 124 is mounted on the lens support adjacent the lens and the apex of the cone is cut away to provide a light opening and this shield serves to prevent the reflection of light onto the lens from the adjacent surfaces within the device. The lens is mounted in the lens support a substantial distance from the forward end of the latter so that this forward end also constitutes a shield which serves to eliminate stray rays of light from the lens.

While I have shown and described certain embodiments of my invention I wish it to be understood that I do not desire to be limited to the details thereof as various modifications may occur to a person skilled in the art.

Having now fully described my invention, what I claim as new and desire to secure by Letters Patent, is:

1. A light projecting device comprising a tubular body member having an internal screw thread adjacent one end thereof and having means to support a lamp, a tubular lens supporting member extending into and spaced from the threaded portion of said body member and having an external screw thread, a lens carried by said supporting member, an annular adjusting device arranged between said members and having exterior and internal screw threads engaging the threads of the respective members, a tubular member supported in said tubular structure in line with said lamp and extending into said tubular lens supporting member and having in that end thereof adjacent said lens a relatively small light opening in axial alinement with said lens, and a plurality of collecting lenses arranged in said tubular element to concentrate the light rays from said lamp and transmit the same through said opening to the first mentioned lens.

2. A light projecting device comprising a tubular body member having an internal screw thread adjacent one end thereof and having means to support a lamp, a non-rotatable axially movable tubular lens supporting member having a portion to extend into the threaded portion of said body member in radially spaced relation thereto, and having an external screw thread, a lens carried by said supporting member, an annular adjusting device arranged between said members and having exterior and internal screw threads engaging the threads of the respective members, and a stop fixed with relation to said body member, said supporting member having a part to engage said stop and limit the outward movements of said supporting member and said adjusting device the several screw threads being of such length and so arranged that no part of said threads will be exposed by the movement of said lens supporting member to the outer limit of its adjustment.

3. A light projecting device comprising a tubular body member having an internal screw thread adjacent one end thereof and having means to support a lamp, a non-rotatable axially movable tubular lens supporting member having a portion to extend into the threaded portion of said body member in radially spaced relation thereto, and having an external screw thread, a lens carried by said supporting member, an annular adjusting device arranged between said members and having exterior and internal screw threads engaging the threads of the respective members, and a stop fixed with relation to said body member, said supporting member having a part to engage said stop and limit the outward movements of said supporting member and said adjusting device said adjusting member and said body member having smooth cylindrical contact surfaces extending outwardly beyond the threaded portions thereof, said adjusting device and said lens supporting member having smooth cylindrical contact surfaces extending outwardly beyond the threaded portions thereof, said cylindrical surfaces being of such axial lengths that none of said screw threads can be exposed by the adjustments of said lens supporting member.

PAUL F. EARLY.

REFERENCES CITED

The following references are of record in the file of this patent:

UNITED STATES PATENTS

| Number | Name | Date |
|---|---|---|
| 661,682 | Avery et al. | Nov. 13, 1900 |
| 975,672 | Bausch | Nov. 15, 1910 |
| 996,662 | Myers | July 4, 1911 |
| 1,604,370 | Upton | Oct. 26, 1926 |
| 1,682,139 | Mitchell | Aug. 28, 1928 |
| 1,690,607 | Wittel | Nov. 6, 1928 |
| 1,695,556 | McGunnigle | Dec. 18, 1928 |
| 1,871,551 | O'Brien | Aug. 16, 1932 |
| 2,038,514 | Hummert | Apr. 21, 1936 |
| 2,109,056 | Baldwell et al. | Feb. 22, 1938 |
| 2,170,552 | De Porter | Aug. 22, 1939 |
| 2,172,340 | Mihalyi | Sept. 5, 1939 |
| 2,279,476 | Mihalyi | Apr. 14, 1942 |
| 2,309,104 | Direksen et al. | Jan. 26, 1943 |
| 2,350,676 | Fetterman | June 6, 1944 |